(12) United States Patent
Lee et al.

(10) Patent No.: US 9,899,723 B2
(45) Date of Patent: Feb. 20, 2018

(54) ANTENNA MODULE AND ELECTRONIC DEVICE INCLUDING THE SAME

(71) Applicant: Samsung Electronics Co., Ltd., Gyeonggi-do (KR)

(72) Inventors: In-young Lee, Gyeonggi-do (KR); Hwan-myung Noh, Gyeonggi-do (KR); Byung-gil Jeon, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 371 days.

(21) Appl. No.: 14/518,064

(22) Filed: Oct. 20, 2014

(65) Prior Publication Data
US 2015/0295302 A1     Oct. 15, 2015

(30) Foreign Application Priority Data

Apr. 10, 2014  (KR) .................. 10-2014-0042984

(51) Int. Cl.
*H01Q 1/22* (2006.01)
*H01Q 7/00* (2006.01)
*G06F 1/16* (2006.01)
*G06K 7/10* (2006.01)

(52) U.S. Cl.
CPC ......... *H01Q 1/2266* (2013.01); *G06F 1/1698* (2013.01); *H01Q 7/00* (2013.01); *G06K 7/10336* (2013.01)

(58) Field of Classification Search
CPC ........ H01Q 1/243; H01Q 1/2266; H01Q 7/00; G06F 1/1698; G06K 7/10336
USPC .......................................................... 343/702
See application file for complete search history.

(56) References Cited

U.S. PATENT DOCUMENTS

| | | | | |
|---|---|---|---|---|
| 5,048,118 A | * | 9/1991 | Brooks | G02F 1/133308 343/702 |
| 2012/0068893 A1 | * | 3/2012 | Guterman | H01Q 1/2266 343/702 |
| 2012/0218723 A1 | * | 8/2012 | Kwak | H01Q 1/243 361/748 |
| 2012/0287003 A1 | * | 11/2012 | Kao | H01Q 7/00 343/702 |
| 2013/0130757 A1 | * | 5/2013 | Luo | H04B 5/00 455/575.7 |
| 2013/0249663 A1 | * | 9/2013 | Cho | H01F 38/14 336/200 |

* cited by examiner

*Primary Examiner* — Dameon E Levi
*Assistant Examiner* — David Lotter
(74) *Attorney, Agent, or Firm* — Cha & Reiter, LLC

(57) ABSTRACT

An electronic device with an antenna, e.g., for near field communication (NFC) is disclosed. The electronic device includes a display, a fixing frame fixing the display and including a bezel area at a periphery of the display, and a communication module disposed at the bezel area. The communication module includes a circuit board, which has an antenna radiator and a communication circuit disposed thereon. The communication module performs wireless communication with an external apparatus via the communication circuit and antenna radiator.

12 Claims, 13 Drawing Sheets

NFC ANTENNA HAVING ASPECT RATIO
OF 3:1 AND FIXING METHOD THEREOF

RF CIRCUIT IMPLEMENTED ON OPPOSITE SURFACE OF NFC
ANTENNA CIRCUIT BOARD AND FIXING METHOD THEREOF

ANTENNA MODULE AND ELECTRONIC DEVICE INCLUDING THE SAME

CLAIM OF PRIORITY

This application claims priority under 35 U.S.C. § 119(a) from Korean Patent Application No. 10-2014-0042984, filed in the Korean Intellectual Property Office on Apr. 10, 2014, the disclosure of which is incorporated herein by reference in its entirety.

BACKGROUND

1. Field

The present disclosure relates to an antenna module and an electronic device including the same, and more particularly, to a near field communication (NFC) antenna within an electronic device.

2. Description of the Related Art

The rapid development of digital communication technology has spawned the development of mobile communication terminals which provide various types of services such as Long Term Evolution (LTE), global positioning system (GPS), near field communication (NFC), wireless local area network (WLAN), etc. (Hereafter, a mobile communication terminal will interchangeably be called a terminal, electronic device or just a device.)

In order to provide the above-described services, an electronic device includes an antenna, which can be an internal antenna or external antenna, depending on the requirements of the device. The internal antenna has been more widely used than the external antenna due to a damage risk of the antenna and a design demand of an electronic device.

An NFC antenna is an example of an internal antenna. Since the NFC antenna needs to be in close proximity to another apparatus for communication therewith, the NFC antenna should be placed near a surface of the electronic device in which it resides. For example, in some devices, an NFC antenna is disposed at a backside of an electronic device or in a battery pack or the like.

SUMMARY

Exemplary embodiments address at least the above problems and/or disadvantages and other disadvantages not described above. However, the exemplary embodiments are not required to overcome the disadvantages described above, and an exemplary embodiment may not overcome any of the problems described above.

Exemplary embodiments provide an antenna module in which an NFC antenna is provided within a fixing frame to support a display, and an electronic device including the same.

According to an aspect of the exemplary embodiments, there is provided an electronic device including a display, a fixing frame fixing the display and including a bezel area at a periphery of the display, and a communication module disposed at the bezel area. The communication module includes a circuit board which has an antenna radiator and a communication circuit disposed thereon. The communication module performs wireless communication with an external apparatus via the communication circuit and antenna radiator.

The fixing frame may have a space formed therein, where the communication module is disposed within the space.

The radiator may be formed in a pattern having a surface in a plane that substantially coincides with a plane of a front surface of the display.

The antenna radiator may face the front side of the electronic device.

The antenna radiator may resonate at a frequency of 13.56 MHz for near field communication (NFC).

The antenna radiator may be a radiator pattern forming a generally rectangular-shaped loop antenna.

A ratio of width to height of the antenna radiator pattern may be at least 3:1.

The antenna radiator may be disposed on a front surface of the circuit board, which faces the same direction as a front side of the display, and the communication circuit may be disposed on a rear surface of the circuit board.

The communication circuit may comprise a chip for NFC, the chip being configured to process a signal transmitted by an external reader.

The communication module may function as an NFC electronic tag.

The electronic device may be an all-in-one PC in which the display is provided in a main body thereof.

The antenna radiator may be configured in a pattern that forms a loop antenna comprising plural spiraling loops, and the pattern may have an outer boundary with a longest dimension that extends a length of less than ¼ of a perimeter of the fixing frame.

The fixing frame may be generally rectangular, and the antenna radiator may be disposed entirely within only a single elongated side member of the fixing frame.

According to an aspect of the exemplary embodiments, an antenna module is provided for use in an electronic device including a display that is fixed by a fixing frame having a bezel area surrounding the display. The antenna module includes a circuit board sized for reception at least partially within a space in the bezel area of the fixing frame; an antenna radiator formed in a pattern disposed at a front surface of the circuit board which faces the same direction as a front surface of the display when the circuit board is received in the space of the bezel area; and a circuit portion disposed at a rear surface of the circuit board to process a signal of the antenna radiator.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
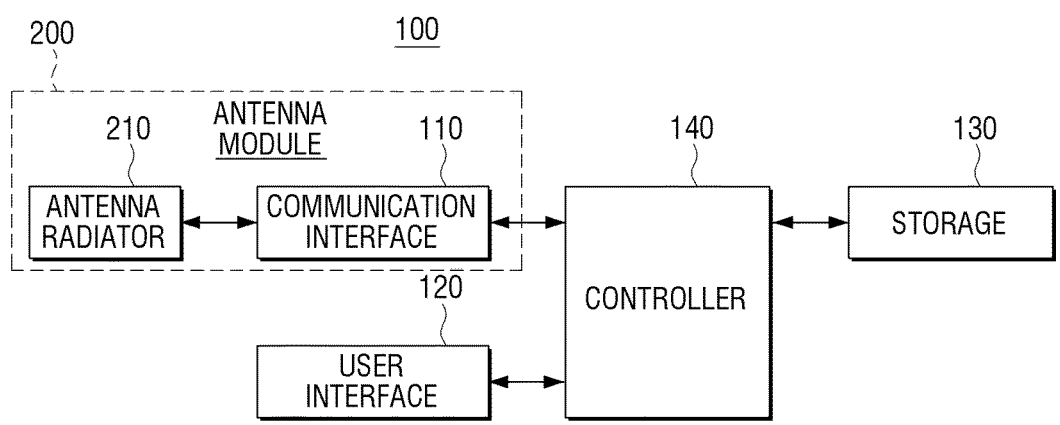
FIG. 1 is a block diagram illustrating a structure of an electronic device according to an exemplary embodiment.

Certain exemplary embodiments are described in further detail below with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of an electronic device, 100, according to an exemplary embodiment of the present general inventive concept. Electronic device 100 includes an antenna module 200, a user interface (UI) 120, a storage 130, and a controller 140. Antenna module 200 includes an antenna radiator 210 and a communication interface (circuit) 110. (Hereafter, antenna module 200 may be referred to interchangeably as just an antenna 200, or as a communication module 200.) Here, the electronic device 100 is an apparatus which has a display (for example, a monitor). Examples include a broadcasting receiver device (for example, a TV), an all-in-one personal computer (PC), and the like.

The communication interface 110 is configured to communicatively connect the electronic device 100 to the external apparatus and may be connected to the external apparatus through a local area network (LAN) and the Internet, or through wireless communication according to a protocol (e.g., NFC, GMS, a Universal Mobile Telephone System (UMTS), LTE, WiBRO, WiFi, Bluetooth, or the like) by using the antenna radiator 210. In addition, the communication interface 110 may be connected to an external apparatus and an internet network using antenna radiator 210 via a plurality of wireless communication methods.

The antenna module 200 includes a circuit board upon which the antenna radiator 210 is disposed, and which includes circuitry connected to the antenna radiator 210. Here, an antenna feed of the circuit board is electrically connected to antenna radiator 210. Antenna radiator 210 is formed in a pattern (e.g., a loop pattern configured for suitable NFC performance). For transmitting, the antenna feed also connects to an RF power source transmitting RF energy through the radiator 210.

The antenna 200 radiates signals using electromagnetic energy provided from the circuit board. The antenna 200 according to an exemplary embodiment is disposed on a fixing frame (interchangeably, "support frame") to fix a display, i.e., support it in a fixed position relative to other components of the electronic device 100 such as a rear housing. Meanwhile, in the examples hereinbelow, it is assumed that the antenna 200 according to an exemplary embodiment is an antenna for NFC. However, in other embodiments, antennas for communications schemes other than NFC may be used.

NFC is a known technology usable for e.g. radio-frequency identification (RFID). NFC employs a contactless near field wireless communication module using a frequency band of 13.56 MHz, and transmits data between terminals within a close distance of 10 cm. NFC has a variety of applications, for example settlement or product information at supermarkets and general shops, transmission of travel information for visitors, transportation, locking apparatus for entrance prohibition, or the like.

Meanwhile, an exemplary location where the antenna 200 may be positioned within device 100 will be explained later with reference to FIG. 2, and an example detailed configuration and operations will be explained with reference to FIG. 3.

The UI 120 includes a plurality of function keys through which a user sets or selects various types of functions supported in the electronic device 100. The UI 120 also displays various types of information provided in the electronic device 100. The UI 120 may be realized as a device which simultaneously realizes an input and an output like a touch screen or as a device in which a keyboard and/or mouse and a monitor are combined.

Figure 5:
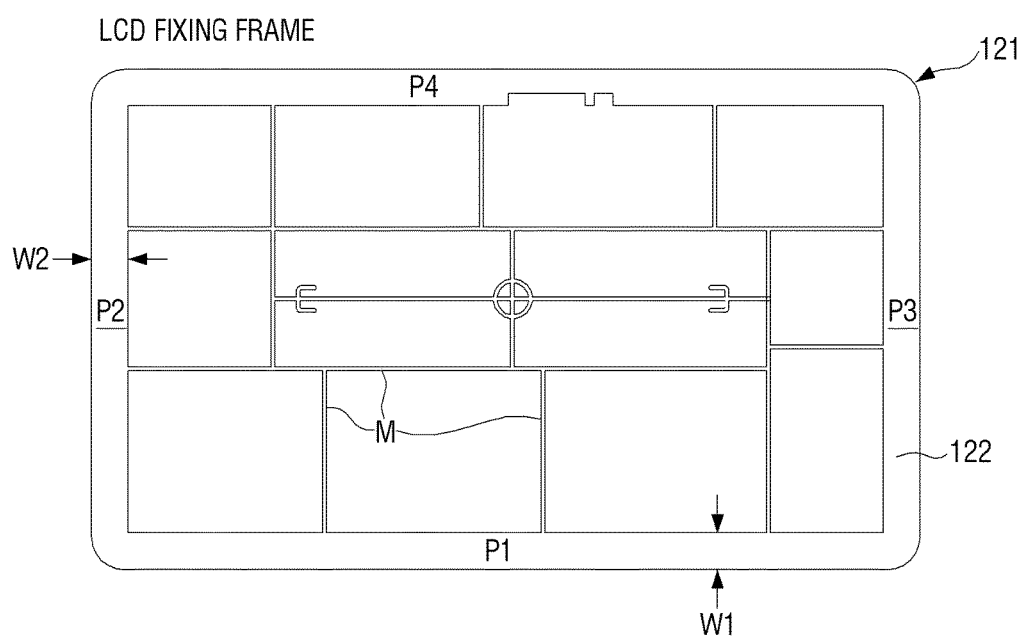
FIG. 5 is a view illustrating an example of a fixing frame to fix a display.
Figure 6:
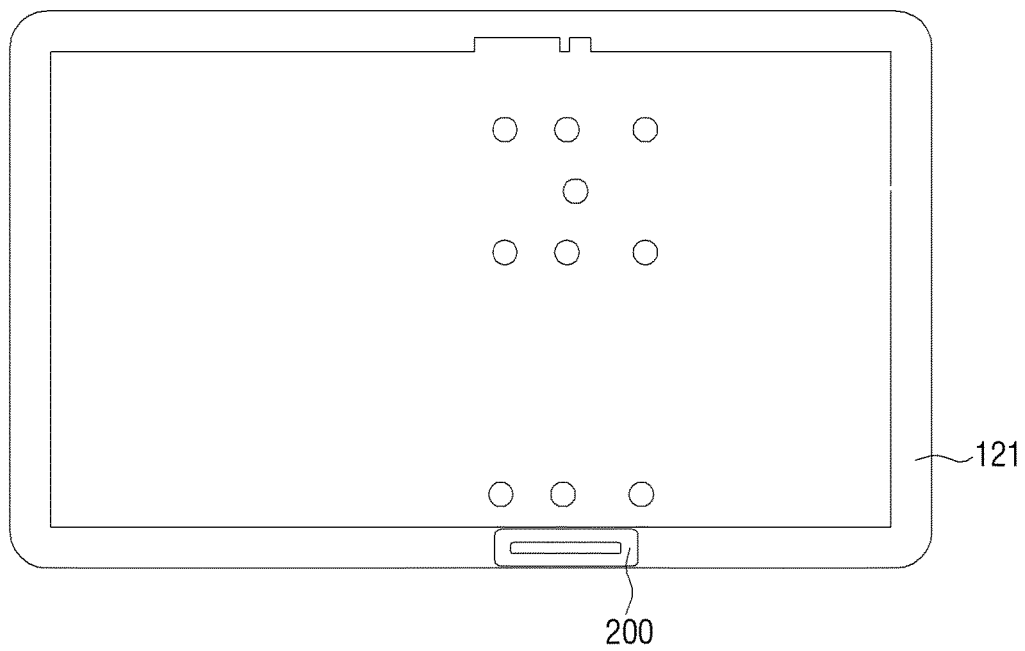
FIG. 6 is a view illustrating an example of a fixing frame which includes a fixing area to fix an antenna module according to an exemplary embodiment.

User interface 120 includes a display which is fixed by the above-noted fixing frame. Referring momentarily to FIG. 5, an example fixing frame 121 has a structure to fix liquid crystal panels such as a liquid crystal display (LCD) and active-matrix organic light-emitting diode (AMOLED) to in a case or housing. The fixing frame according to an exemplary embodiment may have at least one groove area to receive the antenna module 200 as illustrated in FIG. 6.

The storage 130 may store a variety of software programs and data, including a program for driving the electronic device 100. In particular, the storage 130 stores a program which is a set of various types of commands necessary for driving the electronic device 100. Here, examples of the program include a Master Boot Record (MBR) (or a GPT), an operating system (OS), and various types of applications.

The storage 130 may be realized as a storage medium (e.g., a flash memory, a hard disk drive (HDD), a SDD, or the like) of the electronic device 100 or an external medium (e.g., a removable disk including a universal serial bus (USB) memory, a storage medium connected to a host, or a web server through a network).

The controller 140 controls elements of the electronic device 100. For instance, the controller 140 determines input commands of the user, elapse times of the user's input commands (e.g., durations of touch input commands), etc. to determine an operation mode of the electronic device 100.

The controller 140 controls the elements of the electronic device 100 so that the elements have operation states corresponding to the determined operation mode. In detail, the electronic device 100 has a normal mode, a plurality of power saving modes, and a power-off mode. Here, the normal mode refers to an operation mode which is to supply power to the elements of the electronic device 100 in order to perform a process requested by the user. The power save mode refers to an operation mode which is to block or minimize power supplied to a particular element to minimize power consumed in the electronic device 100. The off mode refers to a state in which the electronic device 100 does not operate. For example, the controller 140 may block power supplied to the antenna module 200 in the saving mode.

If a booting command is input, the controller 140 performs booting by using the OS stored in the storage 130. The controller 140 also performs a function corresponding to a user command input through the UI 120 after booting.

As described above, the electronic device 100 according to an exemplary embodiment may communicate with an external apparatus using the NFC antenna 200 which is disposed facing a front side of the electronic device 100, and thus, NFC with an external device may be easily achieved by holding the external device proximate to the front side of device 100. In addition, the NFC antenna according to the exemplary embodiment is fixed inside the fixing frame, and thus, no separate space is required for installing an antenna, whereby size of the electronic device 100 may be decreased or space is freed up for other components.

Figure 2:
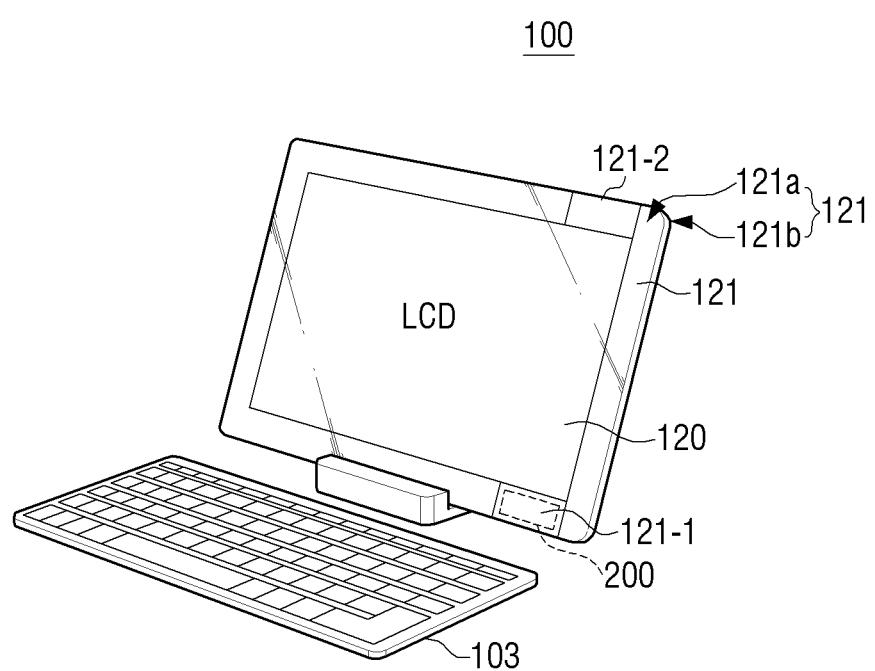
FIG. 2 is a perspective view of an example electronic device according to an exemplary embodiment.

FIG. 2 is a perspective view of an example electronic device 100 that includes an antenna module according to an exemplary embodiment of the present general inventive concept. Here, electronic device 100 includes a display 120 and a fixing frame 121 to fix the display 120.

The fixing frame 121 has a structure to fix a display and may have a shape as illustrated in FIG. 5 and FIG. 6 discussed later.

In an area of fixing frame 121, the antenna module 200 is disposed. Note that since fixing frame 121 has an outer peripheral region that surrounds display 120, the peripheral region may be considered a bezel area of the display 120 (or a bezel area of the fixing frame 121), such that the antenna 200 is said to be disposed at or within a bezel area of the display or fixing frame.

Antenna module 200 may be disposed at an upper bezel area 121-2 or a lower bezel area 121-1 of the display. In other words, the antenna 200 may be disposed at an upper area or a lower area of the fixing frame 121. Alternatively, antenna module 200 may be disposed at the left or right sides of fixing frame 121.

In a typical display, the display is oriented in a landscape orientation with its longest dimension horizontal. As such, the bezels of upper and lower (horizontal) areas are longer in total extent than right and left (vertical) bezel areas. The upper and lower bezel areas may also be wider (in the shorter dimension) than the left and right bezel areas. Therefore, more surface area is typically available on the upper and lower areas of the fixing frame for which to incorporate the antenna 200. However, if right and left areas of bezel of the display are long enough and wide enough for the antenna radiator pattern (e.g. illustrated in FIGS. 11-13) to be disposed, the antenna module may be disposed at the left or right areas of the fixing frame.

It may be preferable to locate the antenna 200 at a lower area 121-1 of the fixing frame 121, since this allows a user to easily tag an external device to the electronic device 100 by holding the external device in proximity to the area 121-1. At an upper area 121-2 of the fixing frame 121, a web cam may be disposed. As the web cam is apart from the antenna 200 with enough distance, it is effective for installation.

As described above, the electronic device 100 according to an exemplary embodiment provides an NFC antenna radiator facing a front face, and thus, a user may easily perform an NFC tag.

In the example electronic device 100 of FIG. 2, the display 120 may be a touch screen and thus serve as an example, at least in part, of the UI 120 discussed in connection with FIG. 1. Alternatively or additionally, a separate keyboard 103 may serve at least in part as the user interface. In some embodiments, display 120 may be a non-touchscreen display.

Fixing frame 121 may be formed with two parts, i.e., a front part 121*a* and a rear part 121*b*, which are mechanically coupled during the assembly of device 100 to form the final fixing frame configuration. For instance, antenna module 200 may be sandwiched between the front part 121*a* and the rear part 121*b*, outside the outer perimeter of the display 120. Antenna module 200 may be disposed within a space (e.g. groove) formed within one of the first and second parts 121*a*, 121*b*.

In the example of FIG. 2, the NFC tag may be located at a right bottom end or right upper part of the display. In alternative embodiments, the NFC tag may be located at a left lower part or a left upper part of the display, or at a central region of the upper or lower parts. In addition, instead of employing only one antenna module, electronic device 100 may have a plurality of antenna modules within the fixing frame.

In addition, it has been illustrated that the electronic device 100 of FIG. 2 is a device which is used at a fixed place. However, the device as described above can be applicable to a portable device such as a mobile phone, tablet PC, and a notebook PC.

The locations where the antenna module 200 may be located has been explained above. Hereinbelow, with reference to FIG. 3, a detailed configuration of the antenna module 200 will be described. Further, with reference to FIGS. 4-10, a combination type of the fixing frame 121 and the antenna module will be described.

Figure 3:
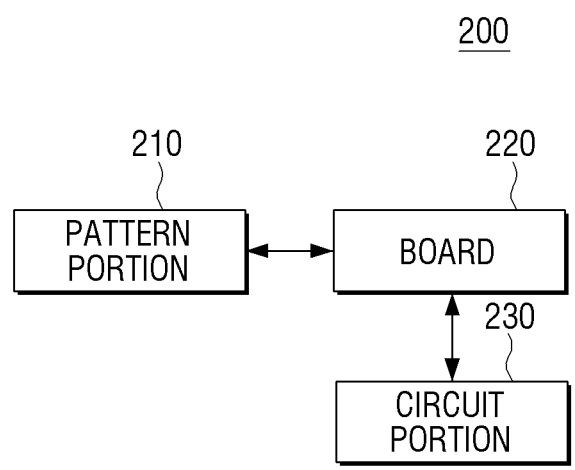
FIG. 3 is a block diagram illustrating a configuration of an antenna module according to an exemplary embodiment.

FIG. 3 is a block diagram illustrating a configuration of the antenna module according to an exemplary embodiment. As shown, antenna module 200 includes a pattern portion 210, a circuit board 220, and a circuit portion 230. The pattern portion 210 and circuit portion 230 are examples of the antenna radiator 210 and communication interface 110, respectively, of FIG. 2.

The circuit board 220 is located at the fixing frame 121 which supports the display. Circuit board 220 may be disposed within an interior space of the fixing frame 121, such as in a space or recess within the front case 121*a* and/or the rear case 121*b*.

The pattern portion 210 includes an antenna radiator formed in a pattern (interchangeably referred to as a radiator pattern or just a radiator). The radiator is disposed on one surface of the circuit board 220, which is preferably the surface facing a front direction of the electronic device 100. The radiator pattern may be configured as a generally rectangular loop antenna which resonates in 13.56 MHz frequency band for NFC communication. A loop antenna is a directional antenna which coils a wire or conductive strip in rectangular, square, triangle, or circular shapes. Herein, the term loop antenna encompasses both a conventional loop antenna (which may have a single loop or multiple non-spiraling loops) and a spiral antenna. When multiple spiraling loops are employed, the loop antenna is considered a spiral antenna.

Figure 9:
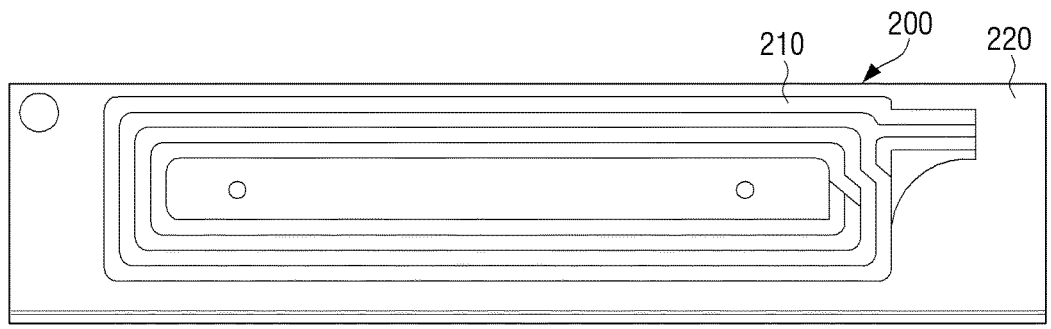
Figure 12:
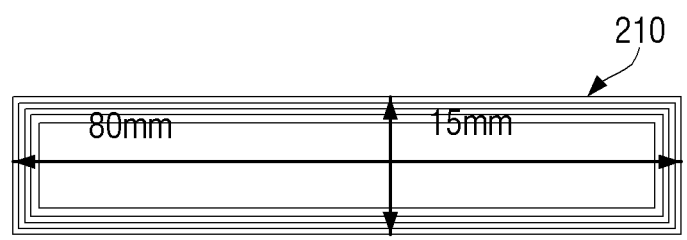
Figure 13:
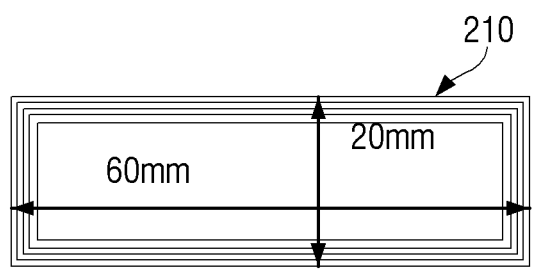

The loop antenna may have various ratios of width to height. In one example, the ratio of width to height is 3:1 (or about 3:1), as illustrated in FIG. 9. In another example, illustrated in FIG. 11, the loop antenna may be a pattern of (or about) 100 mm in width and 12 mm in height. Alternatively, as illustrated in FIG. 12, it may be a pattern of (or about) 80 mm in width and 15 mm in height. As illustrated in FIG. 13, it may be a pattern of (or about) 60 mm in width and 20 mm in height. In these figures, width and height are each denoted from outer edges of a multi-loop structure.

The pattern portion 210 may be disposed on one side of the circuit board 220 while circuit portion 230 is disposed on an opposite side of the circuit board 220. Circuit portion 230 is a circuit for processing an antenna signal transmitted to/from the pattern portion (radiator). In particular, for NFC applications, the circuit portion 230 includes a chip for near field communication (NFC) which processes a signal received by and/or transmitted to an external reader.

As described above, an antenna radiator according to the exemplary embodiment has a shape which may be fixed inside the fixing frame, and thus, may be easily attached when assembling the display to the electronic device.

Figure 4:
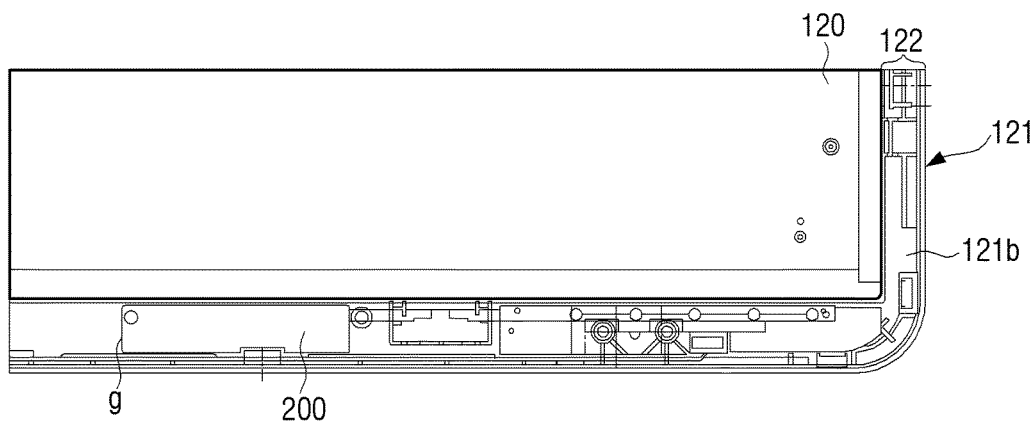
FIG. 4 is a view illustrating an example of disposition of an antenna module according to an exemplary embodiment.

FIG. 4 is a view illustrating an example of disposition of the antenna module according to an exemplary embodiment. FIG. 5 is a view illustrating an example of a fixing frame to fix the display. FIG. 6 is a view illustrating an example of a fixing frame which includes a fixing area to fix the antenna module according to an exemplary embodiment.

Referring to FIGS. 4-6, the fixing frame 121 supports the display 120. To be specific, the fixing frame 121 has a rectangular shape to fix the display. Here, an outer frame portion of the fixing frame 121 is a bezel area of the display (also referred to as a bezel area of the fixing frame), and in the exemplary embodiment, the antenna module 200 is disposed within the bezel area.

The fixing frame 121 according to the exemplary embodiment includes a groove, space or recess area "g" which provides a space to accommodate the antenna module 200 within either the front part 121a of the rear part 121b of fixing frame 121. In FIG. 4, the groove g is shown as being formed within the rear part 121b. The groove g provides a space to accommodate antenna module 200 so that the antenna module is fixed inside the groove area. Having this structure, assembly is simplified and safety of the structure is improved. This configuration is preferable to one in which the antenna module is merely fixed to the fixing frame, which could result in an inconvenience in assembling the display to the fixing frame. In the latter case, in an extreme example, the antenna module or display could be damaged during the assembly process.

The antenna module according to the exemplary embodiment is preferably disposed within a bezel area 122 of the above-described fixing frame 121. For example, as shown in FIG. 5, a bezel area 122 of fixing frame 121 is an area surrounding an outer perimeter of display 120 and is composed of upper and lower peripheral side members P1 and P4 and left and right peripheral side members P2, P3. Support members "M" extend from the sides of bezel area 122 towards the interior of the fixing frame 121 to aid in supporting the display. The display 120 may be disposed such that its perimeter approximately abuts the interior perimeter of the bezel area 122, as shown in FIG. 4. The groove g and antenna module 200 may be located just outside the confines of the display 120 perimeter. Each side member P1 to P4 has a respective width W1, W2, etc. measured from an outer edge of the side member to its innermost edge. As illustrated in FIG. 4, the width W1 of the lower member may be larger than the widths of the side members so as to accommodate the antenna module 200.

A related art NFC antenna has a rectangular shape that loops around the entire display, and thus, it is difficult to use the rectangular-shaped antenna in its conventional form. A loop pattern of the antenna module 200 according to the exemplary embodiment is generally rectangular with multiple, closely spaced loops arranged for disposition in only a minority portion of the bezel area 122. For example, in embodiments shown below, the length of the area occupied by the radiator pattern of antenna 200 is less than ¼ of the perimeter of fixing frame 121. Note that the radiator pattern may be confined to an area within only a single peripheral side member P1, P2, P3 or P4 as seen in FIG. 4. Moreover, the groove g, and thus the antenna module 200, may also have a length which is only a minority portion of a single side member P1, as seen in both FIGS. 4 and 6.

Hereinbelow, referring to FIGS. 7-13, example configurations and placement of the antenna radiator will be explained.

Figure 7:
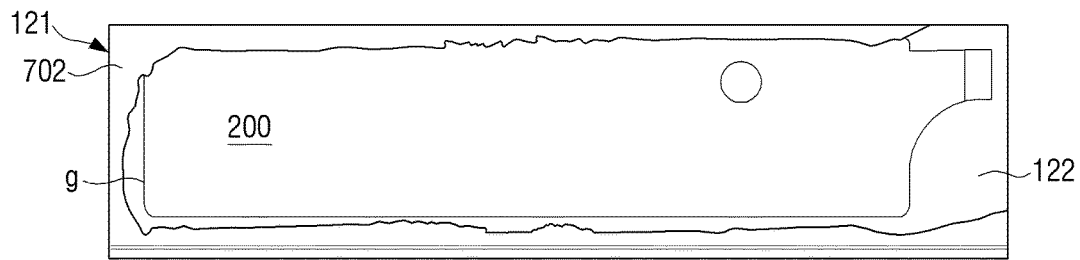
FIG. 7 is an enlarged, cut-away view of the fixing area of FIG. 6.

FIG. 7 is an enlarged, cut-away view of the fixing area of FIG. 6. As illustrated, antenna module 200 resides in bezel area 122 behind a front surface 702 of fixing frame 121.

Figure 8:
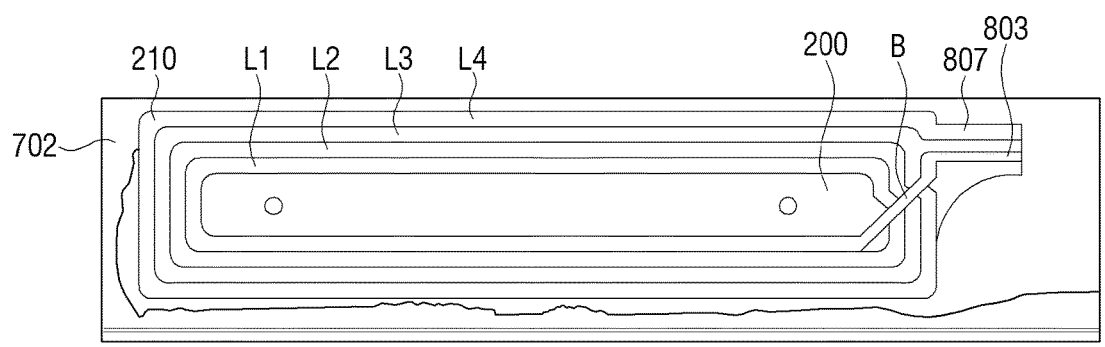
FIG. 8, FIG. 9 and FIG. 10 are views illustrating respective configurations of an antenna module disposed on the fixing area of FIG. 6.
Figure 10:
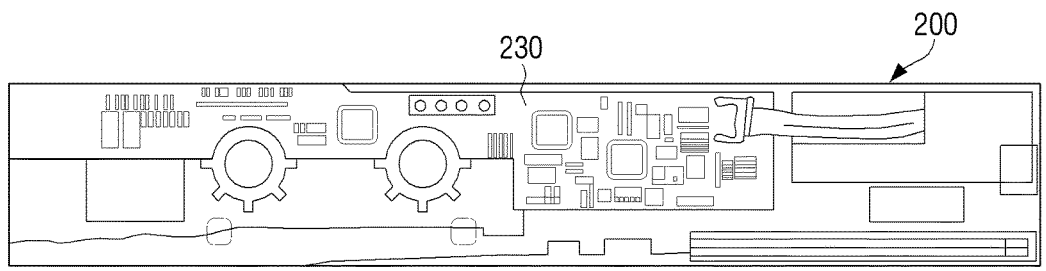

FIGS. 8-10 are views illustrating respective configurations of the antenna module 200 disposed on the fixing area of FIG. 6. Referring collectively to FIGS. 7-10, the fixing area "g" of the fixing frame 121 where the antenna module is disposed, may have a generally rectangular shape. Accordingly, the radiator pattern of antenna 200 according to the exemplary embodiment, i.e., the pattern portion 210, has a loop antenna in a generally rectangular shape as illustrated in FIG. 8. The loop antenna of pattern portion 210 may be comprised of plural, closely spaced spiraling loops L1, L2, L3 and L4. Inner loop L1 is directly connected through a bridge section B to one feeding end 803 of antenna 200. Outer loop L4 is directly connected to another feeding end 807 of the antenna 200. The feeding ends 803, 807 may be directly connected to the circuit portion 230 disposed on the opposite side of the circuit board 220, by means of a feed-through connection or the like extending in the thickness direction of the circuit board.

Based on operations of an NFC antenna, it has been found that a ratio of width to height of the antenna radiator pattern of 3:1 or more will result in satisfactory performance. Accordingly, the radiator pattern 210 according to exemplary embodiments has a ratio of width to height of 3:1 or more.

Figure 11:
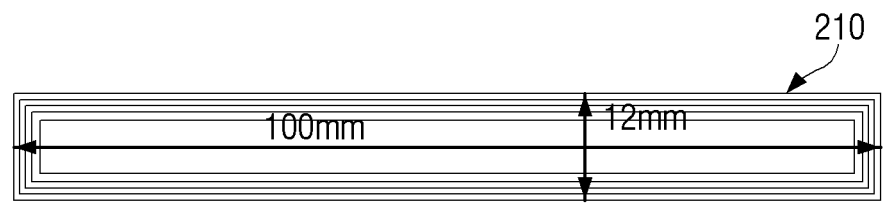
FIG. 11, FIG. 12 and FIG. 13 are views illustrating respective examples of antenna radiator patterns.

For example, as illustrated in FIG. 11, the radiator pattern may extend 100 mm in width and 12 mm in height. As illustrated in FIG. 12, the pattern may be 80 mm in width and 15 mm in height. Further, as illustrated in FIG. 13, the pattern may be 60 mm in width and 20 mm in height.

If the antenna module 200 is disposed in a way that the module is too deeply embedded within the fixing frame 121, there may be a non-negligible distance between the front surface of a case (e.g., the front part 121a of fixing frame 121) which covers the electronic device, and the area where the antenna module is disposed. To position antenna 200 at a desired location, a fixing unit may be provided on the fixing area (bezel area) 122 which enables the radiator pattern to be disposed at approximately a plane coinciding with the front surface of the display 120, as shown in FIG. 4 (for example, the plane of the paper coincides approximately to both the display 120's front surface and the surface of the radiator pattern).

In addition, in the radiator pattern as illustrated in FIG. 10, an NFC chip for processing the antenna signal is adjacently disposed in the very back of the circuit board upon which the radiator pattern is disposed, and thus, communication performance may be maximized.

As described above, the antenna module 200 according to the exemplary embodiment has a shape which is disposable within the bezel area of the display, and thus does not need a separate and large place on the electronic device. In addition, the antenna module is fixed inside the fixing frame, so that productivity can be improved and the cost for assembly can be reduced.

Exemplary embodiments solve a related art problem in which, if an NFC antenna is disposed at a backside of apparatuses which have a large-scaled display such as a television (TV), a monitor, an all-in-one PC, utilization of the NFC is limited.

The foregoing exemplary embodiments are merely exemplary and are not to be construed as limiting. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An electronic device, comprising:
   a display;
   a fixing frame fixing the display and including a bezel area at a periphery of the display; and
   a communication module disposed at the bezel area, comprising an antenna radiator and a communication circuit disposed thereon, the communication module performing wireless communication with an external apparatus via the communication circuit and antenna radiator,
   wherein the bezel area of the fixing frame comprises a space formed therein, and the antenna radiator being disposed within the space, and the communication circuit disposed on an opposite side of the space of the bezel area,
   wherein the antenna radiator faces a same direction as a front side of the display, and the communication circuit faces a same direction as the opposite direction of the front side of the display, and
   wherein the antenna radiator is a radiator pattern forming a generally rectangular-shaped loop antenna.

2. The electronic device as claimed in claim 1, wherein the antenna radiator is formed in a pattern having a surface in a plane that substantially coincides with a plane of a front surface of the display.

3. The electronic device as claimed in claim 1, wherein a front surface of the antenna radiator faces a front side of the electronic device, the front side being a side at which an image is output by the display.

4. The electronic device as claimed in claim 1, wherein the antenna radiator is formed in a pattern that resonates at a frequency of 13.56 MHz for near field communication (NFC).

5. The electronic device as claimed in claim 1, wherein a ratio of width to height of the radiator pattern is about 3:1.

6. The electronic device as claimed in claim 1, wherein width and height of the radiator pattern is one of about 100 mm and 12 mm, about 80 mm and 15 mm, and about 60 mm and 20 mm.

7. The electronic device as claimed in claim 1, wherein the antenna radiator is disposed on a front surface of a circuit board which faces a same direction as a front side of the display, and the communication circuit is disposed on a rear surface of the circuit board.

8. The electronic device as claimed in claim 7, wherein the communication circuit comprises a chip for near field communication (NFC), the chip being configured to process a signal transmitted by an external reader.

9. The electronic device as claimed in claim 1, wherein the communication module functions as a near field communication (NFC) electronic tag.

10. The electronic device as claimed in claim 1, wherein the electronic device is an all-in-one personal computer (PC) in which the display is provided in a main body thereof.

11. The electronic device as claimed in claim 1, wherein the antenna radiator is configured in a pattern that forms a loop antenna comprising plural spiraling loops, and the pattern having an outer boundary with a longest dimension that extends a length of less than ¼ of a perimeter of the fixing frame.

12. The electronic device as claimed in claim 11, wherein the fixing frame is generally rectangular, and the antenna radiator is disposed entirely within only a single elongated side member of the fixing frame.

* * * * *